United States Patent
Chae et al.

(10) Patent No.: US 7,680,145 B2
(45) Date of Patent: Mar. 16, 2010

(54) RETRANSMISSION APPARATUS USING PACKET METHOD FOR DMB SERVICE

(75) Inventors: Kyung-Ho Chae, Seoul (KR);
Jeong-Seok Choi, Yongin-si (KR);
Young-Hun Joo, Yongin-si (KR);
Yun-Je Oh, Yongin-si (KR)

(73) Assignee: Samsung Electronics Co., Ltd., Maetan-Dong, Yeongtong-Gu Suwon-Si, Gyeonggi-Do (KR)

( * ) Notice: Subject to any disclaimer, the term of this patent is extended or adjusted under 35 U.S.C. 154(b) by 601 days.

(21) Appl. No.: 11/591,831

(22) Filed: Nov. 2, 2006

(65) Prior Publication Data

US 2007/0177636 A1      Aug. 2, 2007

(30) Foreign Application Priority Data

Jan. 27, 2006      (KR)      ............ 10-2006-0009043

(51) Int. Cl.
*H04J 3/00*      (2006.01)
(52) U.S. Cl. ........................... 370/454; 370/465
(58) Field of Classification Search .............. None
See application file for complete search history.

(56) References Cited

U.S. PATENT DOCUMENTS 6,785,733 B1 *   8/2004   Mimura et al. ............ 709/236
2006/0104305 A1 *   5/2006   Yoshida et al. ............ 370/466
2006/0215648 A1 *   9/2006   Jen ............................ 370/389

\* cited by examiner

*Primary Examiner*—Chi H Pham
*Assistant Examiner*—Fan Ng
(74) *Attorney, Agent, or Firm*—Cha & Reiter, LLC

(57) ABSTRACT

A retransmission apparatus is provided that uses a packet method for a DMB service and includes: a DMB receiver for receiving DMB data from a medium; a DMB transmission mode release unit that outputs an MPEG-2 TS by releasing a DMB transmission mode in the DMB data received from the DMB receiver; a channel information extractor that extracts channel information contained in a Fast Information Channel (FIC) of the DMB data in the DMB transmission mode release process of the DMB transmission mode release unit; a data information extractor that receives the MPEG-2 TS from the DMB transmission mode release unit and extracts data information indicating a location of an elementary stream from the received MPEG-2 TS; a channel information database (DB) that stores the channel information extracted by the channel information extractor and the data information extracted by the data information extractor as channel data; a first IP streamer that IP-streams the MPEG-2 TS output from the data information extractor; and a second IP streamer that IP-streams the channel data stored in the channel information DB.

8 Claims, 4 Drawing Sheets

RETRANSMISSION APPARATUS USING PACKET METHOD FOR DMB SERVICE

CLAIM OF PRIORITY

This application claims priority under 35 U.S.C. §119 to an application entitled "Retransmission Apparatus Using Packet Method for DMB Service," filed in the Korean Intellectual Property Office on Jan. 27, 2006 and assigned Serial No. 2006-9043, the contents of which are incorporated herein by reference.

BACKGROUND OF THE INVENTION

1. Field of the Invention

The present invention relates to performing a quick channel change when a Digital Multimedia Broadcasting (DMB) signal using a high compression technique, such as H.264, is retransmitted to an Internet Protocol (IP)-based wired/wireless network.

2. Description of the Related Art

Digital Multimedia Broadcasting (DMB) is a Korean system standard for a multimedia broadcasting service comprising video based on Digital Audio Broadcasting (DAB: Eureka-147). DAB is a European digital radio broadcasting standard for simultaneously providing a compact disk (CD)-level high quality audio service and a data service.

In order to receive the DMB broadcasting service, a separate DMB receiver is required, and a DMB signal cannot be received through an Internet Protocol (IP)-based wired/wireless network in which a DMB receiver does not exist.

As a technique for receipt of a DMB signal through an IP-based wired/wireless network, a method of IP encapsulation of Motion Picture Expert Group-2 Transport Stream (MPEG-2 TS)/MPEG-4 Synchronization Layer (SL) DMB data and transmitting the IP-encapsulated DMB data has been developed.

In a retransmission system using a packet method for a DMB service, based on this development, a terminal supporting the packet method without having a separate DMB receiver can receive DMB data from a device having a DMB data decoding function and view a DMB program.

However, in the DMB data retransmission system, a retransmission server transmits only data having a MPEG-2 TS header extracted after performing error correction code from among information regarding DMB data via an IP-based wired/wireless network. Thus, an IP-based terminal must decode DMB data received from the DMB data retransmission system by analyzing a header of each received stream. Accordingly, a complicated process is required for the IP-based terminal to select a channel of DMB data to be received.

FIG. 4 is a flowchart illustrating a conventional channel change method of a terminal receiving retransmitted data in a retransmission system using a packet method for a DMB service.

Referring to FIG. 4, according to the conventional channel change method, packet type data transformed to IP-based data is received in step 41. If a Program Association Table (PAT) exists in the received packet type data in step 42, it is determined in step 44 whether a Program Map Table (PMT) according to the PAT exists in the received packet type data. If the PAT does not exist in the received packet type data in step 42, the relevant PAT is searched for in step 43, and it is determined in step 44 whether the PMT according to the found PAT exists in the received packet type data.

If it is determined in step 44 that the PMT exists in the received packet type data, it is determined in step 46 whether SL data exists in the received packet type data. If it is determined in step 44 that the PMT does not exist in the received packet type data, the relevant PMT is searched for in step 45, and it is determined in step 46 whether SL data according to the found PMT exists in the received packet type data.

If it is determined in step 46 that the SL data exists in the received packet type data, an Audio/Video (AV) packet according to the SL data is executed in step 48. If it is determined in step 46 that the SL data does not exist in the received packet type data, relevant SL data is searched for in step 47, and an AV packet according to the found SL data is executed in step 48.

That is, when a terminal receiving retransmitted data performs a conventional channel change in the retransmission system using a packet method for a DMB service, since all procedures of processing PAT, PMT, and SL data must be performed every time a channel is changed, the channel change operation is complicated and requires a long time.

SUMMARY OF THE INVENTION

The present invention is provides a retransmission apparatus using a packet method for a DMB service that supports a quick channel change, whereby the quick channel change is achieved using channel data when retransmission is performed from a DMB network to an IP-based wired/wireless network.

According to one aspect of the present invention, there is provided a retransmission apparatus using a packet method for a DMB service, the retransmission apparatus comprising: a DMB receiver that receives DMB data from the outside; a DMB transmission mode release unit that outputs an MPEG-2 TS by release of a DMB transmission mode in the DMB data received from the DMB receiver; a channel information extractor that extracts channel information contained in a Fast Information Channel (FIC) of the DMB data in the DMB transmission mode release process of the DMB transmission mode release unit; a data information extractor that receives the MPEG-2 TS from the DMB transmission mode release unit and extracts data information that indicates a location of an elementary stream from the received MPEG-2 TS; a channel information database (DB) that stores the channel information extracted by the channel information extractor and the data information extracted by the data information extractor as channel data; a first IP streamer that IP streams the MPEG-2 TS output from the data information extractor; and a second IP streamer that IP streams the channel data stored in the channel information DB.

BRIEF DESCRIPTION OF THE DRAWINGS

The above and other features and advantages of the present invention will become more apparent from the following detailed description when taken in conjunction with the accompanying drawings in which.

DETAILED DESCRIPTION

Exemplary embodiments of the present invention are described hereinbelow with reference to the accompanying drawings. For the purposes of clarity and simplicity, well-known functions or constructions are not described in detail since they would obscure the invention in unnecessary detail.

Figure 1:
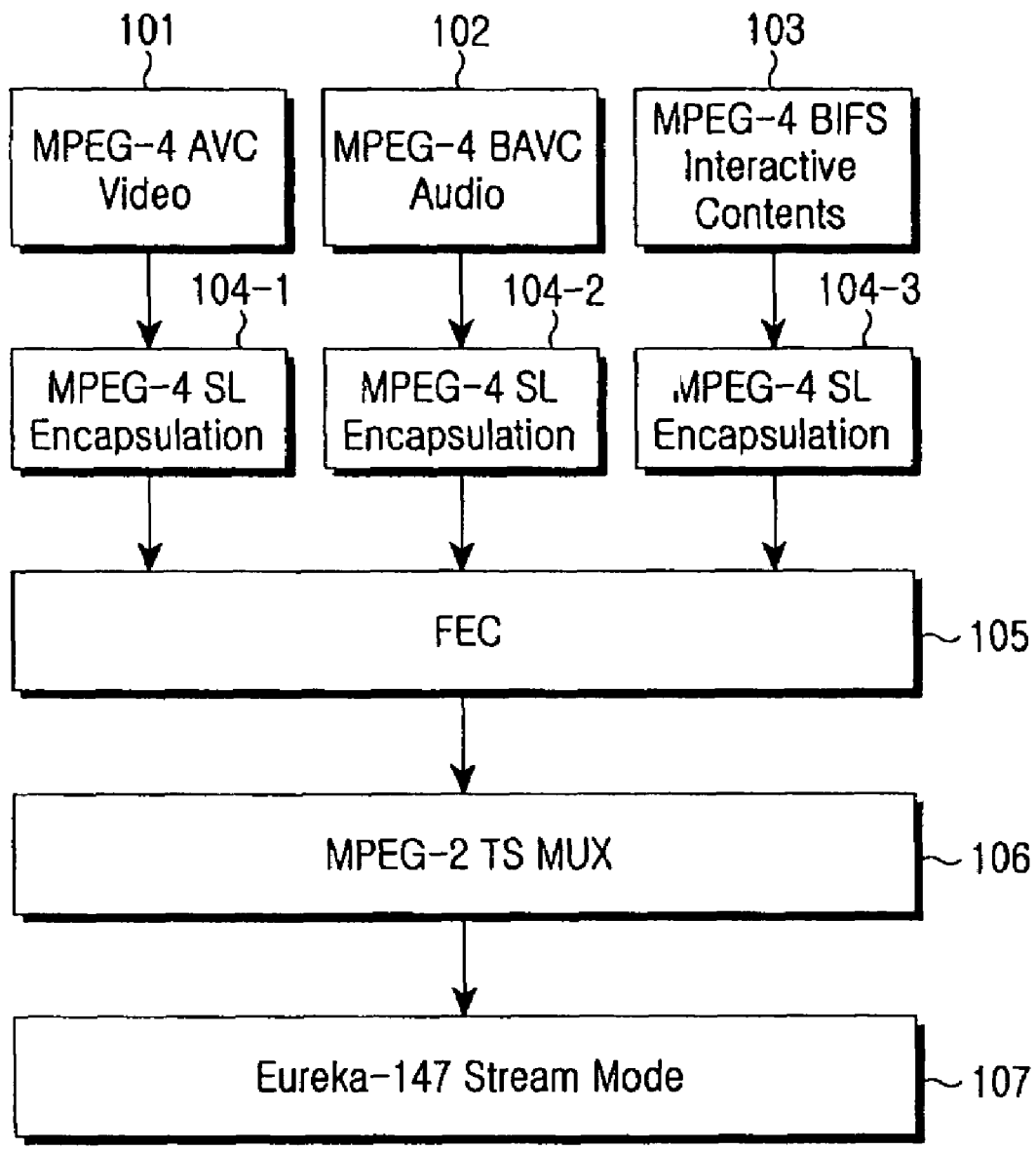
FIG. 1 illustrates a hierarchical structure for DMB data transmission in a conventional general DMB system.

FIG. 1 illustrates a hierarchical structure for DMB data transmission in a conventional general DMB system.

In terms of a compression method, video data is compressed using a Motion Picture Expert Group (MPEG)-4 Part 10 Advanced Video Coding (AVC) (H.264) in step 101, wherein H.264 is an up-to-date compression technique guaranteeing the best efficiency and performance among existing video compression techniques. In particular, when data having a low data rate and a small image size, such as DMB data, is compressed and transmitted, the performance of H.264 is much better than other existing compression techniques. Thus, H.264 has been established as a video standard of T-DMB and S-DMB systems in Korea.

Audio data is compressed using an MPEG-4 Bit Sliced Arithmetic Coding (BSAC) method for T-DMB or an Advanced Audio Codec+(AAC+) method for S-DMB in step 102, wherein the MPEG-4 BSAC method, which is one of a plurality of existing audio data compression methods, has a compression performance similar to other existing audio data compression methods and has a characteristic that a data rate can be easily changed. The preferred embodiments of the present invention are disclosed based on T-DMB.

Data information is compressed in an MPEG-4 Binary Format for Scenes (BIFS) interactive content format in step 103.

Each of the video, audio, and data information is encapsulated in an MPEG-4 Synchronization Layer (SL) in step 104-1, 104-2, or 104-3.

The encapsulated information is Forward Error Correction (FEC) processed for transmission error control in step 105.

The FEC processed video, audio, and data information is multiplexed to an MPEG-2 TS in step 106. An MPEG-2 TS packet comprises a TS packet header and a payload that includes a Packetized Elementary Stream (PES) packet. In particular, the TS packet header includes a Packet Identifier (PID) field, which indicates a type of a signal included in the MPEG-2 TS packet and is used to decode the PES packet when the MPEG-2 TS packet is demultiplexed.

DMB data is formed by packing the multiplexed MPEG-2 TS data in a European Research Coordination Agency Project-147 (Eureka-147) stream mode, which is a DMB transmission mode, in step 107.

Thus, in order to retransmit the DMB data as a signal of a different protocol (e.g., Ethernet), the Eureka-147 stream mode is released, and an MPEG-2 TS is transmitted to a terminal, which can receive packet-based data but cannot receive a DMB signal, using a packet-based transmission protocol. Ethernet is illustrated as the packet-based transmission protocol but the present invention is not limited to Ethernet, and IEEE 1394, Bluetooth, Zigbee, or WLAN can also be used.

Figure 2:
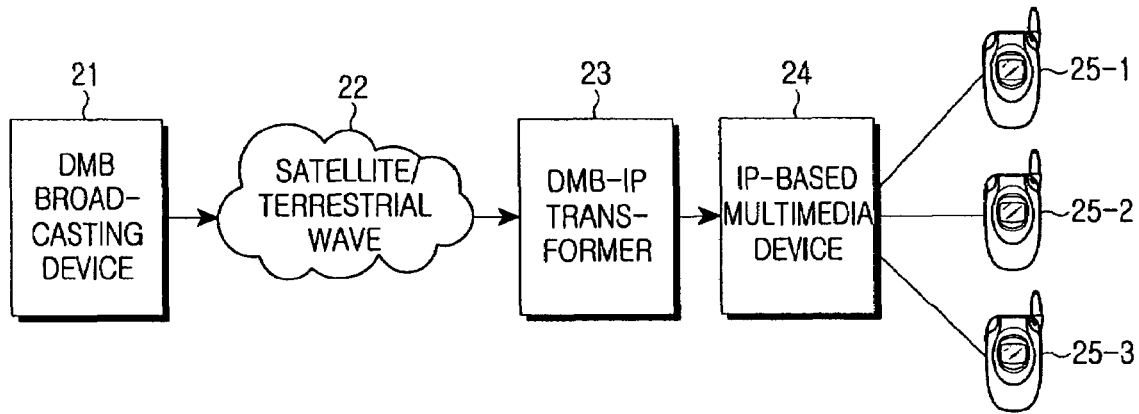
FIG. 2 illustrates a schematic configuration of a conventional retransmission system using a packet method for a DMB service.

FIG. 2 illustrates a schematic configuration of a conventional retransmission system using a packet method for a DMB service.

Referring to FIG. 2, the conventional retransmission system includes a DMB broadcasting device 21 that receives produced multimedia data from content providers, forms DMB data for DMB transmission using the received multimedia data, and transmits the DMB data, a satellite/terrestrial wave 22, which is a transfer medium through which the DMB data transmitted from the DMB broadcasting device 21 is transferred, a DMB-IP transformer 23 that receives the DMB data via the satellite/terrestrial wave 22 and transforms the received DMB data to packet-based multimedia data, and an IP-based multimedia transmission device 24 that transmits the packet-based multimedia data transformed by the DMB-IP transformer 23 to user devices 25-1, 25-2, and 25-3.

The DMB broadcasting device 21 includes a broadcasting center (not shown) that receives produced multimedia data from content providers and forms DMB data for DMB transmission, transmission facilities (not shown) that transmit the DMB data formed by the broadcasting center, and gap fillers (not shown) that retransmit the DMB data to remove DMB broadcasting shadow areas.

Each of the user devices 25-1, 25-2, and 25-3 is a terminal device, which cannot directly receive DMB data, and corresponds to any of a plurality of known devices which can process packet-based data.

Figure 3:
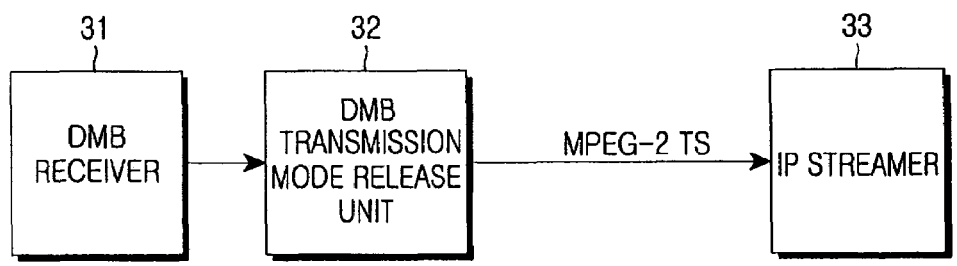
FIG. 3 illustrates a block diagram of a conventional retransmission apparatus using a packet method for a DMB service.

FIG. 3 illustrates a block diagram of a conventional retransmission apparatus using a packet method for a DMB service.

Referring to FIG. 3, the retransmission apparatus includes a DMB receiver 31 that receives DMB data transmitted via the satellite/terrestrial wave 22 illustrated in FIG. 2, a DMB transmission mode release unit 32 that outputs an MPEG-2 TS by releasing a DMB transmission mode in the DMB data received from the DMB receiver 31, and an IP streamer 33 that IP streams the MPEG-2 TS input from the DMB transmission mode release unit 32.

The DMB transmission mode release unit 32 extracts the MPEG-2 TS from the received DMB data in real-time, and the IP streamer 33 converts the MPEG-2 TS to an Adapter Support Interface (ASI) format and IP streams the ASI format MPEG-2 TS.

In general, two methods of IP streaming H.264-based multimedia data exist, wherein one is a method of creating an MPEG-2 TS using the H.264-based multimedia data and encapsulating the MPEG-2 TS into an IP (European Telecommunications Standards Institute (ETSI) TS 101 154: November, 2004 version) and the other is a method of creating an MPEG-2 TS using the H.264-based multimedia data and encapsulating the MPEG-2 TS into an IP (European Telecommunications Standards Institute (ETSI TS 102 005: newly established in November, 2004).

Since H.264 data is carried on an MPEG-2 TS and transmitted in a DMB system, IP streaming using the first method is illustrated.

Figure 4:
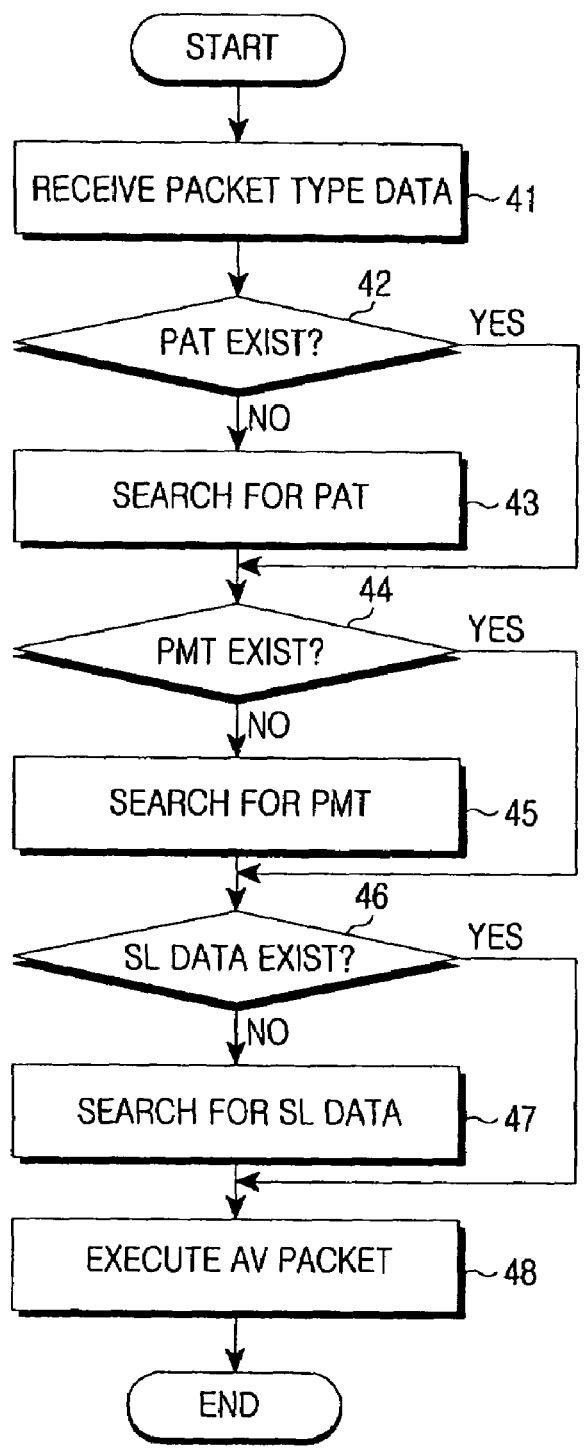
FIG. 4 illustrates a flowchart of a conventional channel change method of a terminal receiving retransmitted data in a retransmission system using a packet method for a DMB service.

FIG. 4 illustrates a flowchart of a conventional channel change method of a terminal receiving retransmitted data in a retransmission system using a packet method for a DMB service.

Referring to FIG. 4, according to the conventional channel change method, packet type data transformed to IP-based data is received in step 41. If a Program Association Table (PAT) exists in the received packet type data in step 42, it is determined in step 44 whether a Program Map Table (PMT) according to the PAT exists in the received packet type data. If the PAT does not exist in the received packet type data in step 42, a relevant PAT is searched for in step 43, and it is determined in step 44 whether a PMT according to the found PAT exists in the received packet type data.

If it is determined in step 44 that the PMT exists in the received packet type data, it is determined in step 46 whether SL data exists in the received packet type data. If it is determined in step 44 that the PMT does not exist in the received packet type data, a relevant PMT is searched for in step 45, and it is determined in step 46 whether SL data according to the found PMT exists in the received packet type data.

If it is determined in step 46 that the SL data exists in the received packet type data, an Audio/Video (AV) packet according to the SL data is executed in step 48. If it is determined in step 46 that the SL data does not exist in the received packet type data, relevant SL data is searched for in step 47, and an AV packet according to the found SL data is executed in step 48.

That is, as illustrated in FIG. 4, when a terminal receiving retransmitted data performs a channel change in the retransmission system using a packet method for a DMB service, since all procedures of processing PAT, PMT, and SL data must be performed every time a channel is changed, the channel change operation is complicated and requires a long time.

The conventional process illustrated in FIG. 4 is a process of receiving an MPEG-2 TS and searching for desired data, wherein the PMT is searched for using the PAT, and the SL data is searched for using the PMT. This process is a process for searching for data contained in an MPEG-2 TS separately from channel information with which a user is familiar. Thus, for performing a quick channel change according to a preferred embodiment of the present invention, it is necessary to omit the separate data search process by simplifying the data search process in which channel information is simultaneously searched for and directly search for data of a desired channel.

Figure 5:
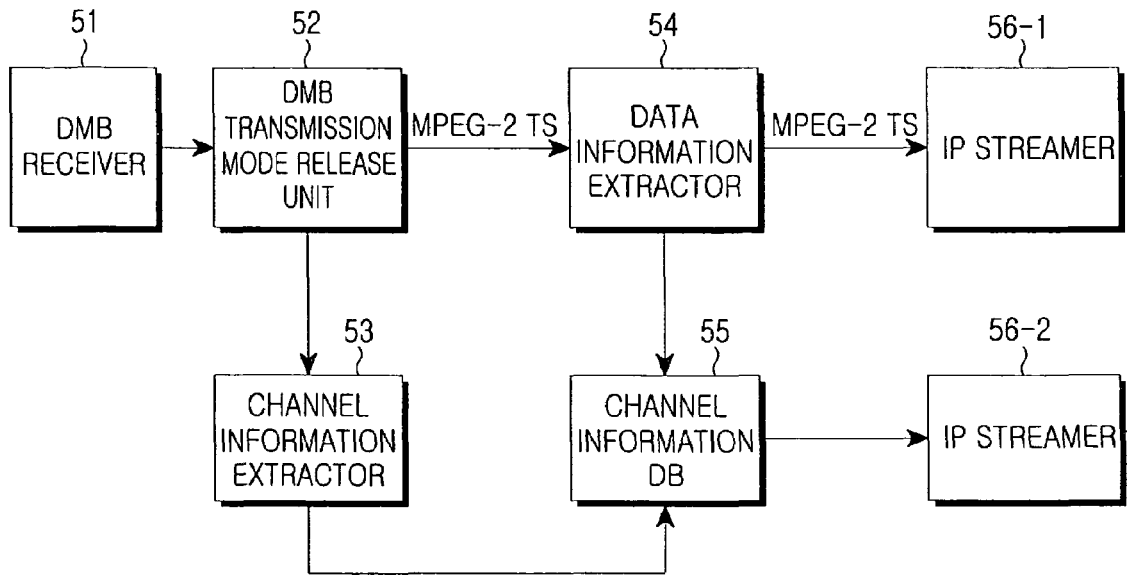
FIG. 5 illustrates a block diagram of a retransmission apparatus using a packet method for a DMB service, which supports a quick channel change, according to a preferred embodiment of the present invention.

FIG. 5 illustrates a block diagram of a retransmission apparatus using a packet method for a DMB service, which supports a quick channel change, according to a preferred embodiment of the present invention.

Referring to FIG. 5, the retransmission apparatus includes a DMB receiver 51 that receives DMB data transmitted via a satellite/terrestrial wave, a DMB transmission mode release unit 52 that outputs an MPEG-2 TS by releasing a DMB transmission mode in the DMB data received from the DMB receiver 51, a channel information extractor 53 that extracts ensemble information and service information contained in a Fast Information Channel (FIC) of the DMB data in the DMB transmission mode release process of the DMB transmission mode release unit 52, a data information extractor 54 that receives the MPEG-2 TS from the DMB transmission mode release unit 52 and extracts location information of PAT, PMT, and SL data from the received MPEG-2 TS, a channel information database (DB) 55 that stores the ensemble information and the service information extracted by the channel information extractor 53 and the location information of PAT, PMT, and SL data extracted by the data information extractor 54, and IP streamers 56-1 and 56-2 that IP stream the channel data stored in the channel information DB 55.

A plurality of DMB receivers 51, a plurality of DMB transmission mode release units 52, a plurality of channel information extractors 53, a plurality of data information extractors 54, and a plurality of IP streamers 56-1 can exist to match respective ensembles. In this case, channel information and data information obtained from the ensembles are also stored in the channel information DB 55 and IP streamed as channel data by the IP streamer 56-2.

The DMB transmission mode release unit 52 extracts the MPEG-2 TS from the received DMB data. The IP streamer 56-1 converts the MPEG-2 TS to an ASI format and IP streams the ASI format MPEG-2 TS.

In general, two methods of IP streaming H.264-based multimedia data exist, wherein one is a method of creating an MPEG-2 TS using the H.264-based multimedia data and encapsulating the MPEG-2 TS into an IP (European Telecommunications Standards Institute (ETSI) TS 101 154: November, 2004 version) and the other is a method of creating an MPEG-2 TS using the H.264-based multimedia data and encapsulating the MPEG-2 TS into an IP (European Telecommunications Standards Institute (ETSI TS 102 005: newly established in November, 2004).

Since H.264 data is carried on an MPEG-2 TS and transmitted in the current embodiment, IP streaming using the first method is illustrated.

The retransmission apparatus according to the current embodiment obtains ensemble information and service information (i.e., channel information) contained in an FIC of DMB data using the channel information extractor 53, obtains PAT, PMT, and SL data (i.e., elementary stream) information (data information) of each video stream (MPEG-2 TS) using the data information extractor 54, stores the obtained channel information and data information in the channel information DB 55 by matching the channel information with the obtained data information, and provides the stored channel information and data information. By providing the channel information and the data information, when a user terminal requests a channel change, the retransmission apparatus according to the current embodiment can receive a relevant MPEG-2 TS and directly extract AV information from the received MPEG-2 TS using the stored PAT, PMT, and SL data information, unlike the prior art in which PAT, PMT, and SL data information must be searched for using the conventional process illustrated in FIG. 4.

In addition, when a user terminal requests a channel change, the user terminal can request a channel according to information provided by the channel information DB 55, thereby easily requesting a channel search and change.

Figure 6:
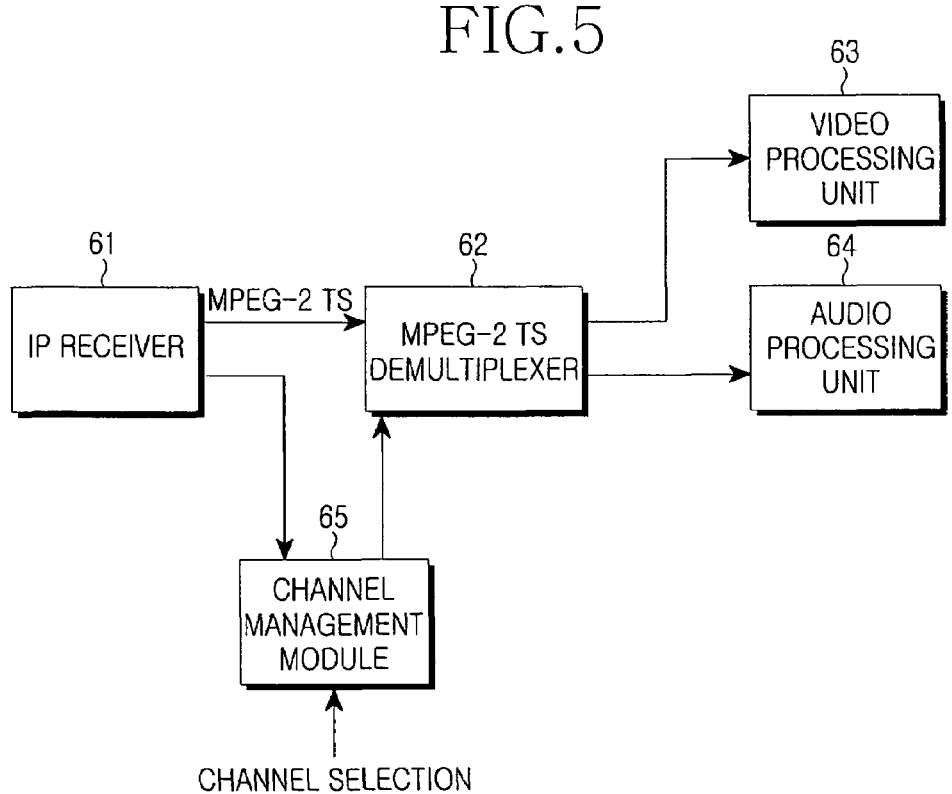
FIG. 6 illustrates a block diagram of a terminal for receiving retransmitted packet type data for a DMB service, which supports a quick channel change, according to a preferred embodiment of the present invention.

FIG. 6 illustrates a block diagram of a terminal for receiving retransmitted packet type data for a DMB service, which supports a quick channel change, according to a preferred embodiment of the present invention.

Referring to FIG. 6, the terminal includes an IP receiver 61 that receives an IP stream from the retransmission apparatus illustrated in FIG. 5 and outputs channel data, a channel management module 65 that receives channel data output from the IP receiver 61 and stores and manages the received channel data, an MPEG-2 TS demultiplexer 62 that receives an MPEG-2 TS from the IP receiver 61 and demultiplexes the received MPEG-2 TS according to data information received from the channel management module 65, a video processing unit 63 that processes video information demultiplexed by the MPEG-2 TS demultiplexer 62, and an audio processing unit 64 that processes audio information demultiplexed by the MPEG-2 TS demultiplexer 62.

Since the data information (e.g., PAT, PMT, and SL data information) stored in the channel management module 65 is directly input to the MPEG-2 TS demultiplexer 62, a service delay time due to a channel change can be reduced. In addition, since ensemble information and service information, which are not contained in the MPEG-2 TS, are stored in the channel management module 65, additional information can be displayed on a user screen.

The additional information can be obtained from the channel information and is transmitted using a Multiplex Information Configuration (MIC) included in an FIC in a T-DMB system.

Information contained in the MIC provided by the T-DMB system includes information about a sub-channel configuration, information about a possible service list in an ensemble (the ensemble is the uppermost container consisting of an audio service, a video service, and a data service of DMB), connection information of services and service components, connection information of sub-channels and the service components, and multiplex reconfiguration management information.

The additional information can be displayed as a user-friendly reconfiguration thereof and can be overlapped on a DMB screen if necessary. For example, information on a channel name of a current channel and a service format of the current channel can be provided on a currently displayed DMB screen image.

As described above, according to the present invention, when DMB data is retransmitted to an IP-based wired/wireless network, since a terminal can receive and process video information required in a channel change through a separate IP channel, a quick channel change can be accomplished by analyzing all MPEG-2 TSs received immediately after a DMB video channel is changed.

While the invention has been illustrated and described with reference to a certain preferred embodiment thereof, it will be understood by those skilled in the art that various changes in form and details may be made therein without departing from the spirit and scope of the invention as defined by the appended claims.

What is claimed is:

1. A retransmission apparatus using a packet method for a Digital Multimedia Broadcasting (DMB) service, the retransmission apparatus comprising:
   a DMB receiver that receives a DMB data over a medium and outputs the received DMB data;
   a DMB transmission mode release unit that receives the output DMB data from the DMB receiver, outputs a Motion Picture Expert Group-2 Transport Stream (MPEG-2 TS) by releasing a DMB transmission mode in the DMB data received from the DMB receiver;
   a channel information extractor that extracts and outputs channel information contained in a Fast Information Channel (FIC) of the DMB data in the DMB transmission mode release process of the DMB transmission mode release unit;
   a data information extractor that receives the MPEG-2 TS output by the DMB transmission mode release unit and extracts and outputs data information indicating a location of an elementary stream within the received MPEG-2 TS;
   a channel information database (DB) that stores the channel information extracted and output by the channel information extractor and the data information extracted and output by the data information extractor as channel data;
   a first IP streamer that IP-streams the MPEG-2 TS output by the data information extractor; and
   a second IP streamer that retrieves therefrom and IP-streams the channel data stored in the channel information DB.

2. The retransmission apparatus of claim 1, wherein the channel information comprises ensemble information and service information.

3. The retransmission apparatus of claim 1, wherein the data information contains location information of a Program Association Table (PAT), a Program Map Table (PMT), and a Synchronization Layer (SL) data of the MPEG-2 TS.

4. The retransmission apparatus of claim 1, wherein each of the DMB receiver, the DMB transmission mode release unit, the channel information extractor, the data information extractor, and the first IP streamer is a respective plurality of DMB receivers, a plurality of DMB transmission mode release units, a plurality of channel information extractors, a plurality of data information extractors, and a plurality of first IP-streamers configured to match ensembles of the DMB service.

5. The retransmission apparatus of claim 4, wherein the channel information DB receives the channel information from the plurality of channel information extractors and the data information from the plurality of data information extractors and stores the received channel information and data information.

6. A receiving apparatus for receiving a retransmitted packet type data for Digital Multimedia Broadcasting (DMB) service by receiving an Internet Protocol (IP) stream from a retransmission apparatus, said receiving apparatus comprising:
   an IP receiver that receives and outputs the IP stream from the retransmission apparatus;
   a channel management module that receives and outputs the channel data output by the IP receiver and stores and manages the received channel data;
   a Motion Picture Expert Group-2 Transport Stream (MPEG-2 TS) demultiplexer that receives and outputs the MPEG-2 TS by releasing a DMB transmission mode in a DMB data received from the IP receiver and demultiplexes the received MPEG-2 TS to video information and audio information according to the channel data output by the channel management module;
   a video processing unit for processing the video information demultiplexed and output by the MPEG-2 TS demultiplexer; and
   an audio processing unit that processes the audio information demultiplexed and output by the MPEG-2 TS demultiplexer,
   wherein the channel data comprises a channel information contained in a Fast Information Channel (FIC) of the DMB data ad a data information indicating a location of an elementary stream within the MPEG-2 TS.

7. The receiving apparatus of claim 6, wherein the receiving apparatus is further configured to output additional information using a channel information contained in the channel data.

8. The receiving apparatus of claim 7, wherein the additional information is at least one information selected from the group consisting of:
   information about a sub-channel configuration,
   information about a possible service list in an ensemble of DMB (the ensemble is the uppermost container consisting of an audio service, a video service, and a data service of DMB),
   connection information of services of the DMB service and service components,
   connection information of sub-channels of the DMB service and the service components, and
   multiplex reconfiguration management information of the DMB service.

* * * * *